United States Patent

Murayama et al.

Patent Number: 5,185,743
Date of Patent: Feb. 9, 1993

[54] SIGNALING CELL SWITCHING SYSTEM

[75] Inventors: Masami Murayama, Yokohama; Atsuhisa Takahashi, Kawasaki; Satoshi Kakuma; Shuji Yoshimura, both of Kawasaki, all of Japan

[73] Assignee: Fujitsu Limited, Kawasaki, Japan

[21] Appl. No.: 651,797

[22] Filed: Feb. 7, 1991

[30] Foreign Application Priority Data

Feb. 8, 1990 [JP] Japan .................. 2-028918

[51] Int. Cl.⁵ .................. H04J 3/12; H04L 12/56
[52] U.S. Cl. .................. 370/110.1; 370/60; 370/94.1
[58] Field of Search .......... 370/60, 60.1, 94.1, 370/94.2, 110.1

[56] References Cited

U.S. PATENT DOCUMENTS 4,494,230  1/1985  Turner .................. 370/60
4,688,214  8/1987  DeWitt et al. .......... 370/60
4,764,919  8/1988  Hunter et al. .......... 370/60
4,907,220  3/1990  Rau et al. ............. 370/60

Primary Examiner—Douglas W. Olms
Assistant Examiner—H. Kizou
Attorney, Agent, or Firm—Staas & Halsey

[57] ABSTRACT

An index value output circuit outputs an index value in response to a VCI added to the first signaling cell outputted from a terminal unit. A switching data output circuit outputs switching data for determining a path for signaling cells, based on the index value. Hence, by revising the index value according to a congestion state of an ATM switch, the above path is dynamically changed. The same index value is inserted in the second and subsequent signaling cells outputted from the terminal unit. Because switching data are based on the same index value, all signaling cells from the same terminal units are fed to the same signaling terminator.

9 Claims, 6 Drawing Sheets

SIGNALING CELL SWITCHING SYSTEM

BACKGROUND OF THE INVENTION

1. Field of the Invention

This invention pertains to a system for transmitting a signaling cell between a user terminal and a signaling terminator of an ATM (Asynchronous Transfer Mode) switch, and more particularly to a signaling cell switching system for variably setting a signaling cell's transmission path and a method of doing same.

2. Description of the Related Art

ISDNs (Integrated Services Digital Networks) are being developed as alternatives to conventional communication networks. A wide-band ATM exchange system stores split communication information in fixed-length cells. These cells are transmitted over an optical transmission path utilizing high-speed switching hardware, enabling a large amount of information to be transmitted efficiently. As in conventional digital switching, an ATM switch requires a sequence for setting a switching path from a sending terminal to a receiving terminal at a call setting time. Therefore, it is necessary to transmit signaling information output from a sending terminal via a network in the ATM switch to a signaling terminal unit at a call setting time.

FIG. 1 shows an example of a configuration of an ATM switch. In FIG. 1, $10_{00}$ through $10_{m0}$ and $10_{01}$ through $10_{m1}$ are VCI (Virtual Channel Identifier) converters (VCC), $4_{00}$ through $4_{20}$ and $4_{01}$ through $4_{21}$ are ATM switching units, $6_0$ and $6_1$ are signaling terminals (SIG), and 17 is a switching controller. ATM switching units $4_{00}$ through $4_{20}$ and $4_{01}$ through $4_{21}$ perform an $(m+1) * (m+1)$ switching. $HW_{00}$ through $HW_{m0}$ and $HW_{01}$ through $HW_{m1}$ attached to the input side and the output side of respective ATM switching units are input ports and output ports for data highways. As described above, the ATM switch shown in FIG. 1 comprises ATM switching units configured in two stages and three columns.

The switching operation of the ATM cell in the above ATM switch is explained below, using a switching from input port $HW_{01}$ to output port $HW_{m0}$ as an example.

(1) A terminal unit (e.g. a telephone device), not shown in the drawing, is connected to input port $HW_{01}$. Using a signaling cell, this unit requests the ATM switch to switch to output port $HW_{m0}$. That is, (as described later) the signaling cell inputted from input port $HW_{01}$ is inputted via a fixed path preset in a network within the switch to the signaling terminator $6_0$, and then to the switching controller 17.

(2) On receiving of the signaling cell, the switching controller 17 notifies the terminal unit connected to input port $HW_{01}$ of a VCI for data transmission via a signaling terminator by using a signaling cell. It also outputs to VCC $10_{01}$ corresponding to input port $HW_{01}$ switching data causing the incoming data cell added with the VCI to switch to output port $HW_{m0}$.

(3) The earlier described terminal unit connected to input port $HW_{01}$ makes cellular the data added with the VCI notified from the switch side and outputs them.

(4) VCC $10_{01}$ corresponding to input port $HW_{01}$ adds to the cells outputted from the terminal unit the switching data corresponding to the VCI added to the cell.

(5) The network within the ATM switch, comprising ATM switching units $4_{00}$ through $4_{20}$ and $4_{01}$ through $4_{21}$, switches inputted cells in accordance with the switching data added to it, and data from the terminal unit connected to input port $HW_{01}$ are outputted to output port $HW_{m0}$.

FIG. 2 shows the sequence of ATM switching operations described above. In FIG. 2, protocols "SETUP", "CALL-PROC" (call processes), "ALERT", "CONN" (connecting), "CONN-ACK" (connection acknowledged), "DISC" (disconnecting), "REL" (releasing) and "REL-COM" (releasing completed) are all signaling data. Respective signaling data inserted in a plurality of signaling cells whose number corresponds to the data amount are transmitted and received. Since the concrete contents of the respective signaling data are not directly related to this invention, so their explanation is omitted.

For switching the signaling cells from input port $HW_{01}$ to output port $HW_{m0}$ in this switching cell, the following routes are conceivable.

(i) A route from ATM switching unit $4_{01}$ via ATM switching unit $4_{10}$ to ATM switching unit $4_{20}$.

(ii) A route from ATM switching unit $4_{01}$ via ATM switching unit $4_{11}$ to ATM switching unit $4_{20}$.

The following routes can also be considered for the part of the above route (i) between ATM switching unit $4_{01}$ and ATM switching unit $4_{10}$.

(a) A route from output port $HW_{01}$ of ATM switching unit $4_{01}$ to input port $HW_{m0}$ of ATM switching unit $4_{10}$.

(b) A route from output port $HW_{11}$ (not shown in FIG. 1) of ATM switching unit $4_{01}$ to input port $HW_{(m-1)0}$ (not shown in FIG. 1) of ATM switching unit $4_{10}$.

These switching routes can vary according to the hysteresis of the switching routes or the switching load (traffic volume) of the ATM switch.

When the terminal unit connected to input port $HW_{01}$, in procedure (1) of the ATM cell switching operations in the ATM switch, requests a switching to output port $HW_{m0}$ by using signaling cells, the outputted signaling cells added with particular VCIs by the terminal unit need to be introduced to the signaling terminator on the switch side.

As a method for setting a network of paths to a signaling terminator for realizing such operations, the method for setting a unity network of fixed paths among ATM switching units $4_{00}$ through $4_{21}$ at the initialization of the ATM switch is conventionally used. That is, VCC $10_{01}$ adds the switching data for specifying the fixed path as described above, as the switching data for its VCI, to inputted signal cells added with particular VCIs by the terminal unit connected to input port $HW_{01}$.

Here, ordinarily, a plurality of signaling terminal units are provided, the number corresponding with the number of terminal units outputting signaling data. The example shown in FIG. 1 indicates the following. Signaling cells from terminal units corresponding to input ports $HW_{00}$ through $HW_{m0}$ are routed in a fixed manner to SIG $6_0$, which is connected to output port $HW_{00}$ of ATM switching unit $4_{20}$. Signaling cells from the terminal units corresponding to input ports $HW_{01}$ through $HW_{m1}$ are routed in a fixed manner to SIG $6_1$, which is connected to output port $HW_{m1}$ of ATM switching unit $4_{21}$.

As described earlier, a conventional ATM switch switches signaling cells to a signaling terminator, as in the line switching method.

Therefore, although signaling data can be properly switched to their corresponding signaling terminator when a switching state allowing fixed paths exists in a switching network, as described above, the workload (congestion) of the ATM switch increases and it becomes impossible to set the above-described fixed paths for inputted signaling cells when any of the ATM switching units on the above described fixed paths is already occupied by another ATM cell. In such a case, an ATM switch can no longer accept a call from a terminal unit, and the problem arises that the switching service is disrupted.

Furthermore, when a system comprises a plurality of signaling terminators, the above described fixed path setting method causes a load deviation at a particular signaling terminator according to the traffic volume. No control, such as for load sharing among the signaling terminators, has yet been realized.

SUMMARY OF THE INVENTION

This invention is conceived based on the above background. It aims at enabling load averaging among a plurality of signaling terminators by setting variable paths to each one.

The signaling cell switching system of this invention is premised on an ATM switch to which are inputted the above described signaling cells outputted from a terminal unit via a path autonomously formed in the switching network according to switching data corresponding to the VCI added to the signaling cells.

The signaling cell switching system comprises an index value outputting part, a switching data outputting part, an index value selection part, a data insertion part, and an index value returning control part.

The index value outputting part outputs an index value corresponding to the VCI added to the first signaling cell outputted from the terminal unit. It has a first table for memorizing index values corresponding to respective VCIs and outputs the index values in correspondence with the above described VCI accessed in the first table.

The switching data outputting part outputs switching data corresponding to the index value. It has a second table for memorizing switching data corresponding to respective index values and outputs the switching data in correspondence with the inputted index values accessed in the second table.

The index value selection part outputs to the switching data outputting part either the index value derived from a signaling cell in correspondence with "route selected" information of the signaling cell or the index value outputted from the index value outputting part in correspondence with "route unselected" information of a signaling cell.

The data insertion part inserts into a signaling cell either the switching data outputted from the switching data outputting part or the index value outputted from the index value outputting part.

The index value returning control part returns the index value of the first signaling cell received at the signaling terminator, back to the terminal unit that sends the first signaling cell.

With the above configuration, "route unselected" information is inserted into the first signaling cell sent from the terminal unit, and "route selected" information and the index value returned from the index value returning control part are inserted into subsequent signaling cells.

Here, index values (i.e. switching data for determining paths of signaling cells) inserted into signaling cells are added to the header parts of the signaling cells, for example.

A signaling cell switching system with the above configuration can also include an index value revising part for revising the index values output from the index value output part. These revised values depend on the state of the switching network, which may be affected by factors such as the workload of the signaling terminator or the switching network congestion.

In this invention with the above configuration, the index value output part outputs the index value corresponding to the VCI inserted in the first signaling cell sent from the terminal unit, and the switching data output part outputs the switching data corresponding to the index value. When the data insertion part inserts the switching data thus obtained to the first signaling cell, the path of the signaling cell is determined.

Further, the index value returning control part returns the index value to the terminal unit. The terminal unit then inserts the index value in the second and subsequent signaling cells and outputs them to the ATM switch. The ATM switch selects the index value inserted in the second and subsequent signaling cells and outputs the corresponding switching data to the switching data output part.

Thus, all the signaling cells from the same terminal unit are sent to the same signaling terminator. In particular, at this time, the index value revising part enables the paths to the same signaling terminator to be variably set. This is achieved by revising the index value determined at an input to the first signaling cell according to the state of the switching network, which may be affected by factors such as the workload of the signaling terminator or network congestion.

Accordingly, a path-setting failure is prevented and the availability of the switching network is improved. When a plurality of signaling terminators are employed, it becomes possible to dynamically set paths to respective signaling terminators, so that their respective workloads become uniform.

BRIEF DESCRIPTION OF THE DRAWINGS

Those skilled in the art can easily understand other features and objectives of this invention from the attached drawings and the description of the preferred embodiment.

DESCRIPTION OF THE PREFERRED EMBODIMENT

Explanation of the Principle

Figure 3:
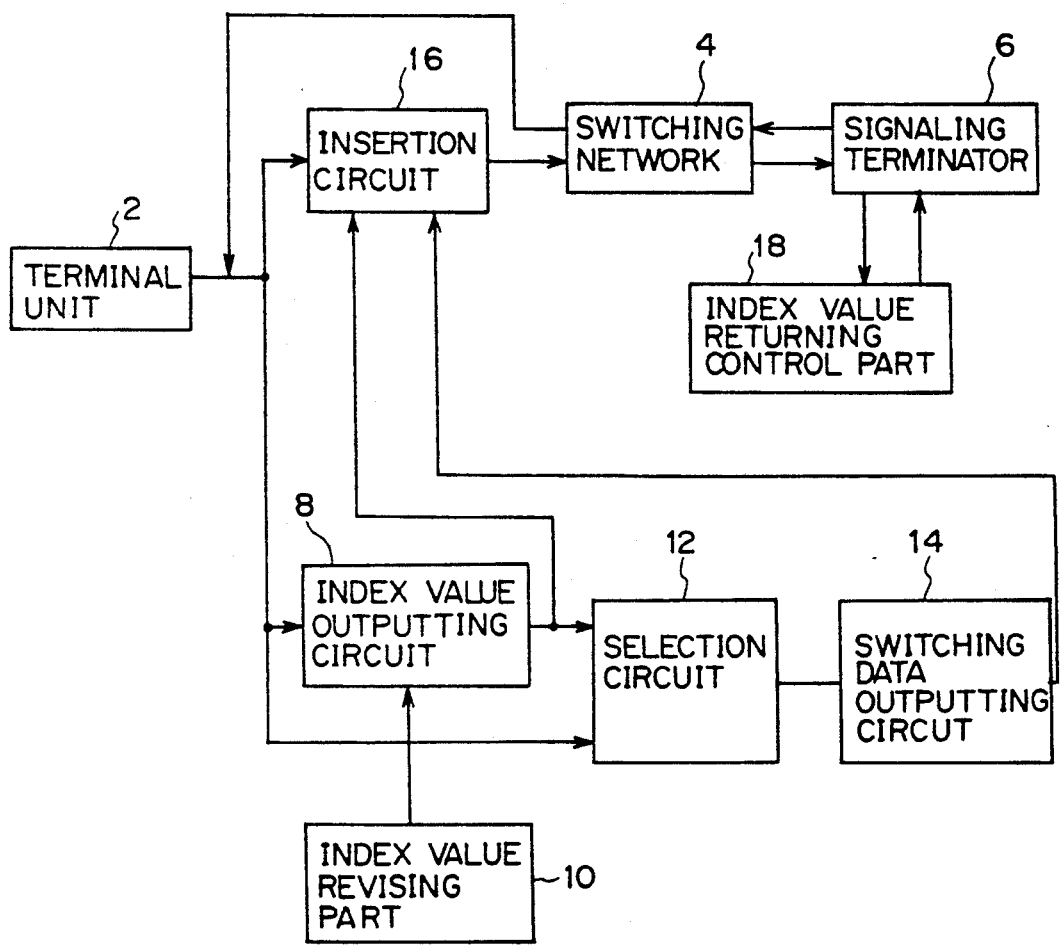
FIG. 3 is a block diagram of this invention.

FIG. 3 is a block diagram of this invention.

The signaling cell switching system of this invention is premised on an ATM switch in which signaling cells outputted from a terminal unit 2 is transmitted to a signaling terminator 6 through a path autonomously formed in a switching network 4 according to switching data corresponding to a VCI added to the signaling cells. The signaling cell switching system comprises an index value outputting circuit 8, an index value revising part 10, a selection circuit 12, a switching data output circuit 14, an insertion circuit 16, and an index value returning control part 18.

The index value outputting circuit 8 outputs the index value corresponding to the VCI added to the first signaling cell outputted from the terminal unit 2. The index value revising part 10 revises index values. The switching data outputting circuit 14 outputs the switching data corresponding to the index value.

The selection circuit 12 outputs to the switching data outputting circuit 14 either the index value output from the index value outputting circuit 8 in correspondence with "route unselected" information of the first signaling cell transmitted from the terminal unit 2 or the index values derived from the second and subsequent signaling cells transmitted from the terminal 2 in correspondence with "route selected" information of the subsequent signaling cells.

The insertion circuit 16 inserts into an inputted signaling cell either the switching data outputted from the switching data output circuit 14 or the index value outputted from the index value output circuit 8.

The index value returning control part 18 returns the index value of the first signaling cell received at the signaling terminator 6 to the terminal unit 2 that sends the first signaling cell.

With the above configuration, "route unselected" information is inserted into the first signaling cell sent from the terminal unit 2. On receipt of the first signaling cell, the index value output circuit 8 outputs the index value corresponding to the VCI inserted into the first signaling cell sent from the terminal unit.

This index value is input to the selection circuit 12 where a response is made to the "route unselected" information and thence to the switching data output circuit 14, which outputs switching data corresponding to the input index value.

The insertion circuit 16 inserts the switching data and the index value into the first signaling cell, which is input to the switching network 4, where a path for the first signaling cell to reach the signaling terminator 6 is automatically formed based on the switching data added to the first signaling cell input.

Further, the index value returning control part 18 returns the index value of the first signaling cell received at the signaling terminator 6 back to the terminal unit 2. Terminal unit 2 then inserts "route selected" information and the index value returned from the index value returning control part into the second and subsequent signaling cells and outputs them to the ATM switch. When the ATM switch receives the signaling cells, the selection circuit 12 outputs the index value inserted in the second and subsequent signaling cells to the switching data output circuit 14, by responding to the route selecting flag in the signaling cell.

Consequently, the switching data output circuit 14 and the insertion circuit 16 add the same switching data based on the same index value to all signaling cells output from the terminal unit 2. These cells are thus fed to the signaling terminator 6 via the same path in the switching network 4.

As described earlier, the path of the signaling cell is determined by the switching data corresponding to the index value. That is, when the index value is revised, the path is also revised. Hence, by causing the index value revising part 10 to change the index value according to the congestion state of the ATM switch, a fault that the ATM switch cannot accept a call-up from the terminal unit 2 is prevented from occurring, thus improving the availability of the switching network 4. When a plurality of signaling terminators are employed, it becomes possible to make the workloads of the respective signaling terminators uniform.

DETAILED DESCRIPTION OF THE PREFERRED EMBODIMENT

Figure 4:
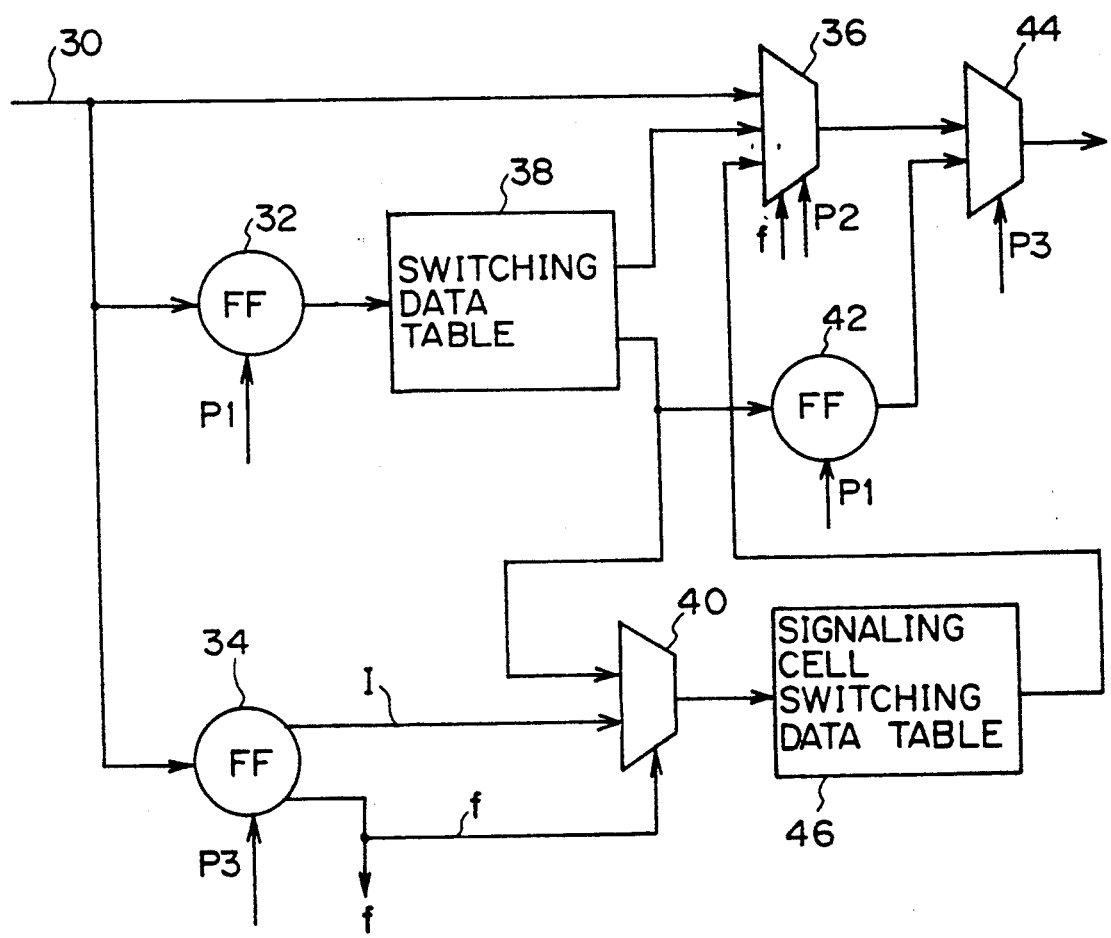
FIG. 4 illustrates the preferred embodiment of this invention.

The following is a detailed description of the preferred embodiment. FIG. 4 shows the configuration of a VCC used in the preferred embodiment of this invention. The ATM switch used in this embodiment is configured similarly to one shown in FIG. 1.

In FIG. 4, the signaling cells transmitted to the input port 30, which is connected e.g. to a telephone terminal unit, are fed to respective first input terminals of flip-flop circuits 32 and 34 and a selector 36.

A pulse (such as P1 shown in FIG. 6) indicating the first byte in the header part of an inputted signaling cell, is fed to the flip-flop circuit 32. Another pulse (such as P3 shown in FIG. 6) indicating the fourth byte in the header part of an inputted signaling cell, is fed to the flip-flop circuit 34. Set pulses P1 and P3, as well as P2 and F, are generated in a widely-known circuit (not shown in FIG. 4) in an ATM switch for detecting receipt of the head end bytes of the input cell.

The output from the flip-flop circuit 32 is fed to a switching data table 38. The output of pulse F (expressed by the first bit of the fourth byte) from a route selection flag "f" in the flip-flop 34 is input to the selection control input terminal of a selector 40. A signal from route selection information part I of the flip-flop circuit 34 is fed to the second data input terminal of the selector 40. The index value outputted from the switching data table 38 is fed to the first data input terminal of the selector 40.

The index value outputted from the switching data table 38 is fed to a selector 44 through a flip-flop circuit 42. This index value is set in the flip-flop circuit 42 by pulse P1 shown in FIG. 6. The selector 44 inserts the index value fed from the switching data table 38 through the flip-flop circuit 42 in the inputted signaling cells.

Meanwhile, the output from the selector 40 is fed to a signaling cell switching data table 46, whose output is fed to the third data input terminal of the selector 36, whose second data input terminal is fed with the switching data output from the switching data table 38. Pulse P2 or F is fed to the selection control input terminal of the selector 36 at the input timing of the second and third bytes in the inputted signaling cell. Thus, the selector 36 selectively outputs switching data either from the signaling cell switching data table 46 or the switching data table 38.

Figure 1:
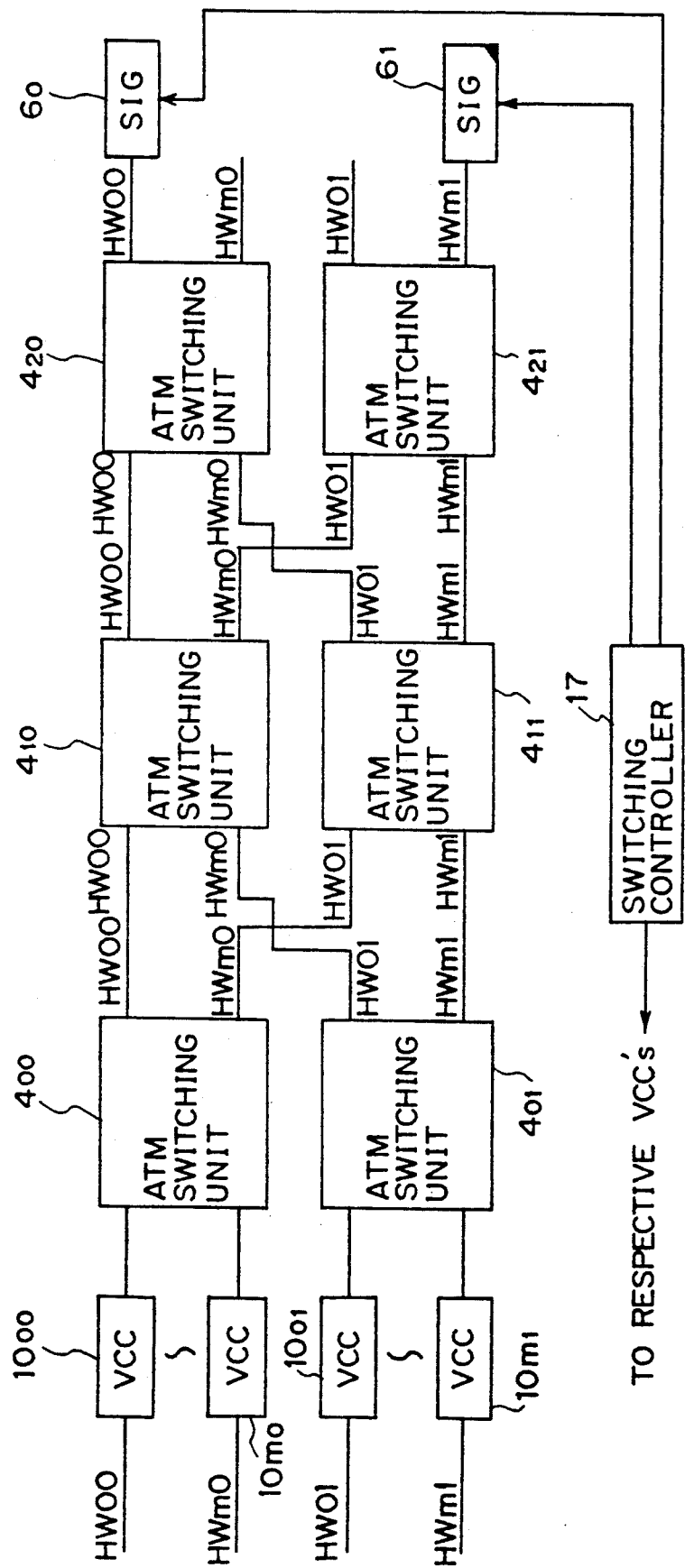
FIG. 1 outlines the configuration of an ATM switch.
Figure 2:
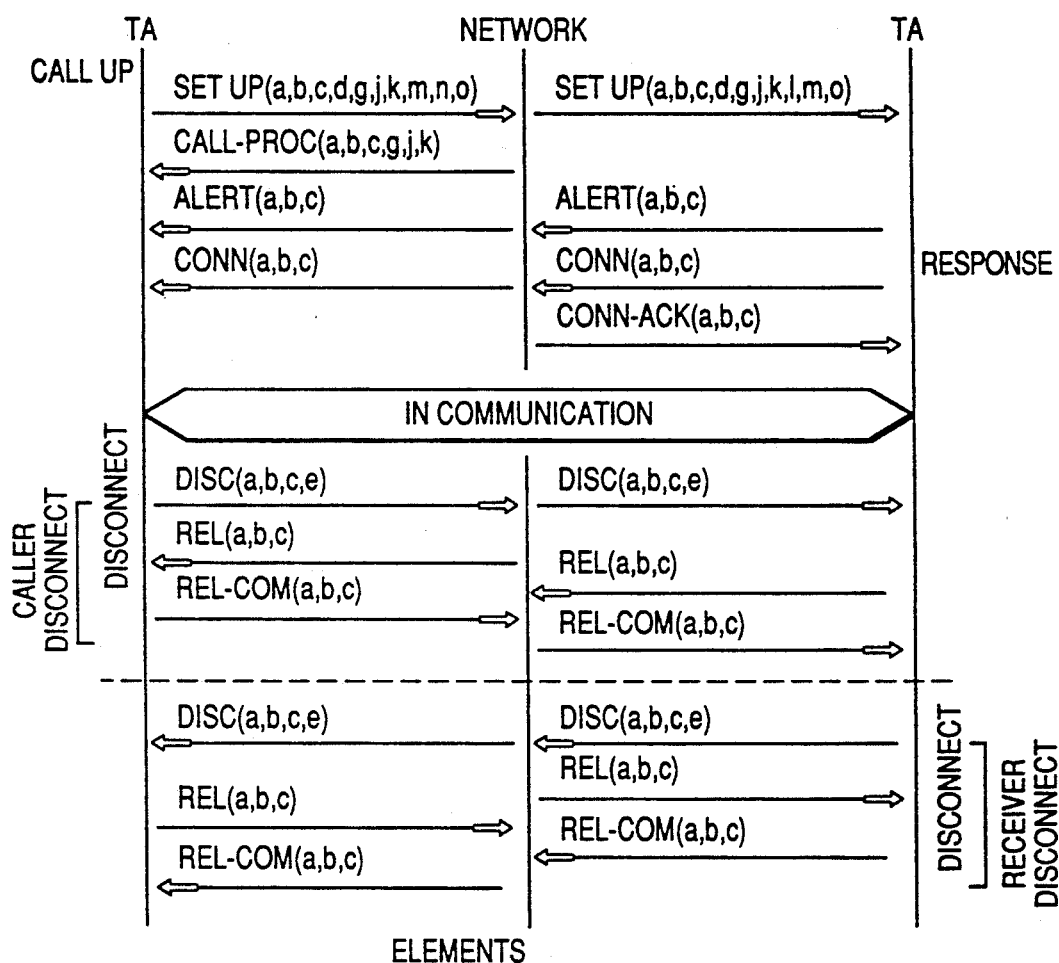
FIG. 2 shown the call-up operation of the ATM switch.

A terminal unit (not shown) such as a telephone device, connected to the input port $HW_{01}$ in FIG. 1 or the input port 30 in FIG. 4, corresponds to the terminal unit 2 in FIG. 3. The switching networks $4_{00}$ through $4_{21}$ in FIG. 1 correspond to the switching network 4 in FIG. 3. The switching data table 38 in FIG. 4 corresponds to the index value output circuit 8 in FIG. 3. The switching controller 17 in FIG. 1 corresponds to the index value revising part 10 in FIG. 3 and the index value returning control part 18 in FIG. 3. The signaling cell switching data table 46 in FIG. 4 corresponds to the switching data output circuit 14 in FIG. 3. The selector 40 in FIG. 4 corresponds to the selection circuit 12 in FIG. 3. Selectors 36 and 44 in FIG. 4 correspond to the insertion circuit 16 in FIG. 3.

The following explains the operation of the VCC shown in FIG. 1, which is particularly related to this invention.

Figure 5:
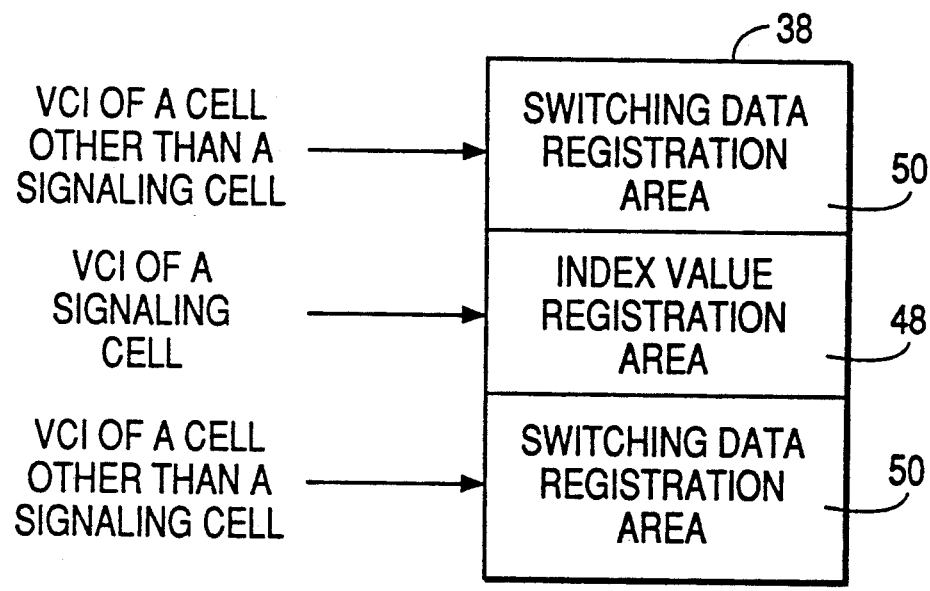
FIG. 5 shows the configuration of the switching data table.

FIG. 5 shows the data configuration in the switching data table 38 shown in FIG. 4. In FIG. 5, the following case is assumed. An index value is preregistered in an index value registration area 48, as described later. The first signaling cell is returned from an ISDN terminal unit accommodated in an ATM switch to the VCC.

Figure 6:
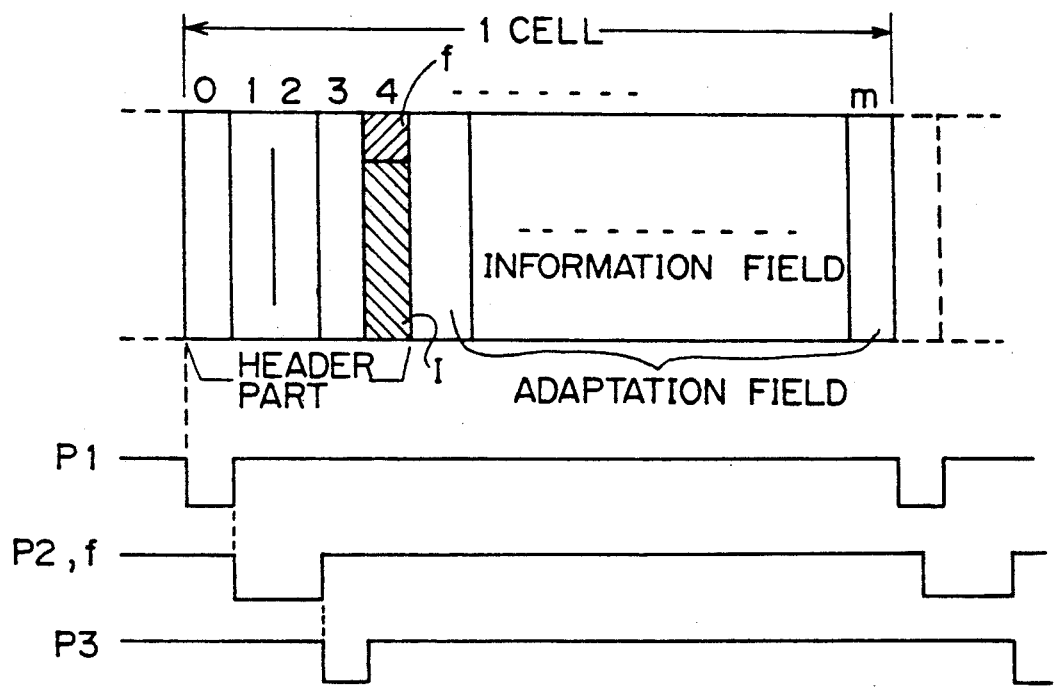
FIG. 6 is a timing chart corresponding to a particular cell format.

In this case, pulse P1, as shown in FIG. 6, is generated first, in response to the input of the first byte (VCI) of the first signaling cell. Pulse P1 sets the VCI in the flip-flop circuit 32. Pulse P3, as shown in FIG. 6, is generated second, in response to the input of the fourth byte of the first signaling cell. Pulse P3 sets the "route selected" information in the flip-flop circuit 34 when route selection flag "f" stored in the first bit of the fourth byte of route selection information part I, indicates an "off" state.

The index value corresponding to the VCI set in the flip-flop circuit 32 is read from the switching data table 38. The index value is fed to the signaling cell switching data table 46 through the selector 40, which responds to the selection flag "f" indicating an "off" state supplied from the flip-flop circuit 34.

Switching data are read from the signaling cell switching data table 46, using the read index value as the address. The selector 36 inserts the switching data to an adaptation field (Refer to FIG. 6.) of the signaling cell, in response to pulses P2 and F in FIG. 6. These pulses are generated by the selector 36 in correspondence with the second and third bytes of the input signaling cell.

Meanwhile, the selector 44 inserts the index value set in the flip-flop circuit 42 into route selection information part I (Refer to FIG. 6.) in the header part of the signaling cell.

In this manner, a signaling cell to which switching data dna an index value are inserted is output to an ATM switching network in the following stage.

Based on switching data added to the first signaling cell inputted to the ATM switching network, a path to the signaling terminator (such as $6_0$ or $6_1$ in FIG. 1) preassigned to the ISDN terminal unit that sends the signaling cell is autonomously formed in this ATM switching network. The signaling cell is sent to the signaling terminator via this path.

In the example shown in FIG. 1, the signaling terminator $6_0$ or $6_1$ which receives the first signaling cell transmits the information on the first signaling cell to the switching controller 17.

The switching controller 17 then responds the VCI to the terminal unit, which sends the signaling cell, according to widely known protocols by sending to the terminal unit a responding cell (or a plurality thereof) whose route selection information part I (Refer to FIG. 6.) in the header part contains the index value of the signaling cell information received from the signaling terminator $6_0$ or $6_1$. The volume of responding signaling data determines the number of the responding cells.

The ISDN terminal unit that receives the responding cell sends second and subsequent signaling cells in the series of operations (from setup to release of communication) after that for the first signaling cell. However, before this, it inserts into the signaling cells "route selected" information (of 1 bit) indicated by an "on" state of the route selection flag information F and the index value (of 7 bits) inserted in the responding cell.

Therefore, in the VCC shown in FIG. 4, when the selector 40 responds to the "route selected" information, the index value of the signaling cell set in the flip-flop circuit 34 is inputted to the signaling cell switching data table 46 through the selector 40.

Switching data read from the signaling cell switching data table 46 based on the above index value are then inserted into the adaptation field (Refer to FIG. 6.) in the input signaling cell as switching data. This operation is similar to the control operation for the first signaling cell described earlier.

Therefore, switching data obtained from the index value similar to the one determined when the first signaling cell is input to the ATM switch are added to the second and subsequent signaling cells. Hence, respective cells output after the first signaling cell are fed to the same signaling terminator as that to which the first signaling cell is fed. Each of signaling cells outputted from the same ISDN terminal device during a series of communication operation is introduced to the same signaling terminator. The cell transmission control operation for the cell other than the signaling cell.

The cell transmission control operation for the cell other than the signaling cell in respective ISDN terminal units is the same as the conventional control system and by using the cell transmission control operation, a discretional data communication is performed between the respective ISDN terminal units and opposing ISDN terminal units as shown in FIG. 8. The VCI added to the cell used for this data communication is employed for making access to switching data registration area 50 shown in FIG. 5 of switching data table 38 (shown in FIG. 4) and the switching data read therefrom is inserted in the corresponding data cells in selector 36 in FIG. 4 in the same manner as in the conventional control operation.

The index value for feeding all signaling cells from the same ISDN terminal unit is revised, when the switching controller shown in FIG. 1 periodically or discretionarily monitors the respective workloads of the signaling terminators 60 and 61 and the congestion of the ATM switching network.

This revising control operation enables the path through the network to be set variably instead of invariably as in the prior art. Consequently, the fault occurrence frequency at path setting for signaling cells, which is quite high in the conventional invariable path setting system, is minimized, thereby improving the availability of the switching network. At the same time, uniform workloads among a plurality of signaling terminators is attained.

The above description of the preferred embodiment discussed the index value revision by monitoring the congestion of the ATM switching network or the workloads of the signaling terminators. However, an index value revision can be performed using other revision standards (such as manual setting).

What is claimed is:

1. A signaling cell switching device in an ATM switch for feeding signaling cells outputted from a terminal unit to a signaling terminator via a path formed in a switching network according to switching data inserted into said signaling cells, said signaling cells containing route selection or route non-selection information, said signaling cell switching device comprising:

an index value outputting means for outputting an index value corresponding to a virtual channel identifier inserted in a first signaling cell containing route non-selection information outputted from the terminal unit;

a switching data outputting means for outputting switching data corresponding to said index value;

an index value selecting means for outputting said index value from said index value outputting means to said switching data outputting means in response to the route non-selection information from said first signaling cell, a data inserting means for inserting said index value outputted from said index value outputting means and said switching data output from said switching data outputting means into said first signaling cell; and an index value returning control means for returning the index value of said first signaling cell received at said signaling cell terminator back to said terminal unit that sent said first signaling cell, whereby said signaling cell switching device inserts said route non-selection information into said first signaling cell outputted from said terminal unit, and inserts said route selection information and said index value returned from said index value returning control means into all signaling cells subsequent to said first signaling cell outputted from said terminal unit.

2. The signaling cell switching device according to claim 1, wherein:

said index value outputting means comprises a first table for memorizing index values for respective virtual channel identifiers; and said index value outputting means outputs a corresponding index value by accessing said first table with the virtual channel identifier inserted in the first signaling cell outputted from said terminal unit.

3. The signaling cell switching device according to claim 1, wherein:

said switching data outputting means comprises a second table for memorizing switching data for respective index values; and said switching data outputting means outputs switching data corresponding to the input index value by referring to said second table.

4. The signaling cell switching device according to claim 1, wherein said index value or said switching data inserted into said signaling cell is added to a header part of said signaling cell.

5. The signaling cell switching device according to claim 1, further comprising:

an index value revising means for revising the index value output from said index value outputting means according to the state of said switching network.

6. The signaling cell switching device according to claim 5, wherein said index value revising means revises said index value according to the workload of said signaling terminator.

7. The signaling cell switching device according to claim 5, wherein said index value revising means revises said index value according to the congestion of said switching network.

8. A signaling cell switching method in an ATM switch for feeding signaling cells outputted from a terminal unit to a signaling terminator over a path formed in a switching network according to switching data inserted in said signaling cell, said signaling cell switching method utilizing:

an index value output step for outputting an index value corresponding to a virtual channel identifier inserted in a first signaling cell transmitted from said terminal unit;

a first switching data output step for outputting switching data corresponding to said index value;

a first signaling cell transmission step for feeding said first signaling cell output from said terminal unit according to said switching data through said switching network to said signaling terminator;

a signaling cell return step for inserting said index value in a response cell for returning information corresponding to said first signaling cell terminated in said signaling terminator and for returning said response cell from said signaling terminator through said switching network to said terminal unit;

an index value inserting step for inserting in second and subsequent signaling cells, the index value inserted in said response cell and display information indicating that the orders of signaling cells are second and subsequent when said terminal unit outputs said second and subsequent signaling cells after said first signaling cell;

a second switching data output step for outputting the same switching data as said switching data outputted to said first signaling cell, in response to said index value and said display information inserted in said second and subsequent signaling cells transmitted from said terminal unit; and a second signaling cell transmission step for feeding said second and subsequent signaling cells transmitted from said terminal unit according to said switching data through said switching network to said signaling terminator.

9. The signaling cell switching method according to claim 8, further utilizing:

an index value revising step for revising the index value to be outputted in said index value outputting step according to the state of said switching network.

* * * * *

UNITED STATES PATENT AND TRADEMARK OFFICE
CERTIFICATE OF CORRECTION

PATENT NO. : 5,185,743
DATED : February 9, 1993
INVENTOR(S) : MASAMI MURAYAMA, ATSUHISA TAKAHASHI, SATOSHI KAKUMA and SHUJI YOSHIMURA It is certified that error appears in the above-identified patent and that said Letters Patent is hereby corrected as shown below:

Column 4,     line 50, "shown" should be --shows--.

Column 7,     line 44, "dna" should be --and--;

Column 10,    line 4, after "wherein" insert a colon --:--;

line 8, after "wherein" insert a colon --:--.

Signed and Sealed this

Twenty-third Day of November, 1993

*Attest:*

BRUCE LEHMAN

*Attesting Officer*     *Commissioner of Patents and Trademarks*